US 8,291,202 B2

(12) United States Patent
Streett et al.

(10) Patent No.: US 8,291,202 B2
(45) Date of Patent: Oct. 16, 2012

(54) APPARATUS AND METHODS FOR SPECULATIVE INTERRUPT VECTOR PREFETCHING

(75) Inventors: Daren Eugene Streett, Apex, NC (US); Brian Michael Stempel, Raleigh, NC (US)

(73) Assignee: QUALCOMM Incorporated

( * ) Notice: Subject to any disclaimer, the term of this patent is extended or adjusted under 35 U.S.C. 154(b) by 744 days.

(21) Appl. No.: 12/188,626

(22) Filed: Aug. 8, 2008

(65) Prior Publication Data

US 2010/0036987 A1 Feb. 11, 2010

(51) Int. Cl.
*G06F 9/30* (2006.01)
*G06F 9/40* (2006.01)
(52) U.S. Cl. ......... 712/244; 712/205; 712/207; 712/229
(58) Field of Classification Search .................. 710/263, 710/264; 712/237
See application file for complete search history.

(56) References Cited

U.S. PATENT DOCUMENTS

| | | | |
|---|---|---|---|
| 5,938,762 | A | 8/1999 | Hayakawa |
| 6,192,466 | B1 | 2/2001 | Gschwind |
| 6,487,653 | B1 | 11/2002 | Oberman |
| 6,651,163 | B1 | 11/2003 | Kranich |
| 2005/0182920 | A1 | 8/2005 | Palus |
| 2005/0204121 | A1 | 9/2005 | Burdass |

OTHER PUBLICATIONS

Reinman et al., "Fetch Directed Instruction Prefetching", Nov. 1999.*
Batcher et al., "Interrupt Triggered Software Prefetching for Embedded CPU Instruction Cache", 2006.*
International Search Report—PCT/US2009/052118, International Search Authority—European Patent Office Jul. 16, 2010.
Written Opinion—PCT/ US2009/052118, International Search Authority—European Patent Office Jul. 16, 2010.
Keown, Koopman and Collins, "Real-Time Performance of the Harris RTX 2000 Stack Architecture Versus the Sun 4 SPARC and the Sun 3 M68020 Architectures With a Proposed Real-Time Performance BenchMark" ACM, 2 Penn Plaza, Suite 701—New York, USA May 4, 1992, XP040069066.

* cited by examiner

*Primary Examiner* — Eddie P Chan
*Assistant Examiner* — Jesse R Moll
(74) *Attorney, Agent, or Firm* — Peter Michael Kamarchik; Nicholas J. Pauley; Jonathan T. Velasco (57) ABSTRACT

Techniques for interrupt processing are described. An exceptional condition is detected in one or more stages of an instruction pipeline in a processor. In response to the detected exceptional condition and prior to the processor accepting an interrupt in response to the detected exceptional condition, an instruction cache is checked for the presence of an instruction at a starting address of an interrupt handler. The instruction at the starting address of the interrupt vector table is prefetched from storage above the instruction cache when the instruction is not present in the instruction cache to load the instruction in the instruction cache, whereby the instruction is made available in the instruction cache by the time the processor accepts the interrupt in response to the detected exceptional condition.

25 Claims, 6 Drawing Sheets

APPARATUS AND METHODS FOR SPECULATIVE INTERRUPT VECTOR PREFETCHING

FIELD OF THE DISCLOSURE

The present disclosure relates generally to techniques for prefetching processor instructions, and particularly relates to speculative interrupt vector prefetching based on exceptional conditions.

BACKGROUND

Many portable products, such as cell phones, laptop computers, personal data assistants (PDAs) and the like, utilize a processor executing programs, such as, communication and multimedia programs. The processing systems for such products include a processor and memory complex for storing instructions and data. Large capacity main memory commonly has slow access times as compared to the processor cycle time. As a consequence, the memory complex is conventionally organized in a hierarchy based on capacity and performance of cache memories, with the highest performance and lowest capacity cache located closest to the processor. Data and instruction caches may be separate or unified or a combination of separate and unified. For example, a level 1 instruction cache and a level 1 data cache would generally be directly coupled to the processor. While a level 2 unified cache may be coupled to the level 1 (L1) instruction and data caches. Further, a system memory is generally coupled to the level 2 (L2) unified cache. Coupling to external storage such as flash memory, hard disk drives, optical drives, and the like may also be provided.

The level 1 instruction cache commonly operates at the processor speed and the level 2 unified cache operates slower than the level 1 cache, but has a faster access time than that of the system memory. Alternative memory organizations abound, for example, memory hierarchies having a level 3 cache in addition to an L1 and an L2 cache. Another memory organization may use only a level 1 cache and a system memory.

One of the principles behind why a memory hierarchy for instruction caches can be used is that instructions tend to be accessed from sequential locations in memory. By having caches hold the most recently used sections of code, processors may execute at a higher performance level. Since programs also contain branch, call, and return type instructions, and support other non-sequential operations such as interrupts, the principle of sequential locality may be maintained only for relatively short sections of code. Due to such non-sequential operations, an instruction fetch to an instruction cache may miss, causing the instruction fetch to be applied to the next higher memory level that operates with a higher memory capacity and slower access time. A miss may cause the processor to stall awaiting the instruction. In order to keep processor performance high, cache miss rates should be low.

When an interrupt occurs, there is a latency between the time the interrupt event is detected and the time when instructions at the location of the associated interrupt handler have been fetched and can begin execution. The latency may be due in part to the interrupt handler not being resident in the instruction cache resulting in lengthy miss and fetch operations to retrieve the instructions before the interrupt handler may execute thereby reducing processor performance. One approach to reducing the latency includes locking the interrupt handlers in the instruction cache, but this approach effectively reduces the size of the cache, which may further reduce processor performance.

SUMMARY

The present disclosure recognizes that in the case in which an associated interrupt handler is not cached, eliminating or reducing memory access latency between the time an interrupt event is detected and the time its associated interrupt handler instructions are available for execution, can improve processor performance. To such ends, an embodiment of the invention addresses a method for interrupt processing. As addressed in greater detail below, an exceptional condition resulting from a failed execution of an instruction is detected in one or more stages of an instruction pipeline in a processor. In response to the detected exceptional condition and prior to the processor accepting an interrupt in response to the detected exceptional condition, an instruction cache is checked for the presence of an instruction at a starting address of an interrupt handler. The instruction at the starting address of the interrupt handler is prefetched from storage above the instruction cache when the instruction is not present in the instruction cache to load the instruction in the instruction cache, whereby the instruction is made available in the instruction cache by the time the processor accepts the interrupt in response to the detected exceptional condition.

Another embodiment of the invention addresses a method for interrupt processing utilizing an interrupt vector table. An exceptional condition is detected in one or more stages of an instruction pipeline in a processor. In response to the detected exceptional condition and prior to the processor accepting an interrupt in response to the detected exceptional condition, an instruction cache is checked for the presence of an instruction held in an interrupt vector table. The instruction is prefetched from storage above the instruction cache when the instruction is not present in the instruction cache to load the instruction and the vector table in the instruction cache. A branch target address of an interrupt handler associated with the detected exceptional condition is calculated upon determining the instruction is a program counter relative branch instruction. The instruction cache is checked for the presence of an interrupt handler instruction at the branch target address. The interrupt handler instruction at the branch target address is prefetched from storage above the instruction cache when the interrupt handler instruction is not present in the instruction cache to load the interrupt handler instruction in the instruction cache, whereby the instruction is made available in the instruction cache by the time the processor accepts the interrupt in response to the detected exceptional condition.

Another embodiment of the invention addresses a processor with interrupt processing logic. Exception detection logic circuitry is utilized in various stages of a processor pipeline to detect one or more exceptional conditions. Prioritization logic circuitry is utilized to generate an exception address based on a predetermined priority for the highest priority detected exceptional condition selected from one or more detected exceptional conditions. First logic circuitry is utilized to check an instruction cache for the presence of an instruction at the exception vector address in response to the selected exceptional condition and prior to the processor accepting an interrupt in response to the detected exceptional condition. Second logic circuitry is utilized to prefetch the instruction at the exception vector address in storage above the instruction cache when the instruction is not present in the instruction cache in order to load the instruction in the instruction cache, whereby the instruction is made available in the instruction cache by the time the processor accepts the interrupt in response to the detected exceptional condition.

Other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the present invention. Accordingly, the drawings and detailed description are to be regarded as illustrative in nature and not as restrictive.

DETAILED DESCRIPTION

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention.

Computer program code or "program code" for being operated upon or for carrying out operations according to the teachings of the invention may be written in a high level programming language such as C, C++, JAVA®, Smalltalk, JavaScript®, Visual Basic®, TSQL, Perl, or in various other programming languages. Programs for the target processor architecture may also be written directly in the native assembler language. A native assembler program uses instruction mnemonic representations of machine level binary instructions. Program code or computer readable medium as used herein refers to machine language code such as object code whose format is understandable by a processor.

Figure 1:
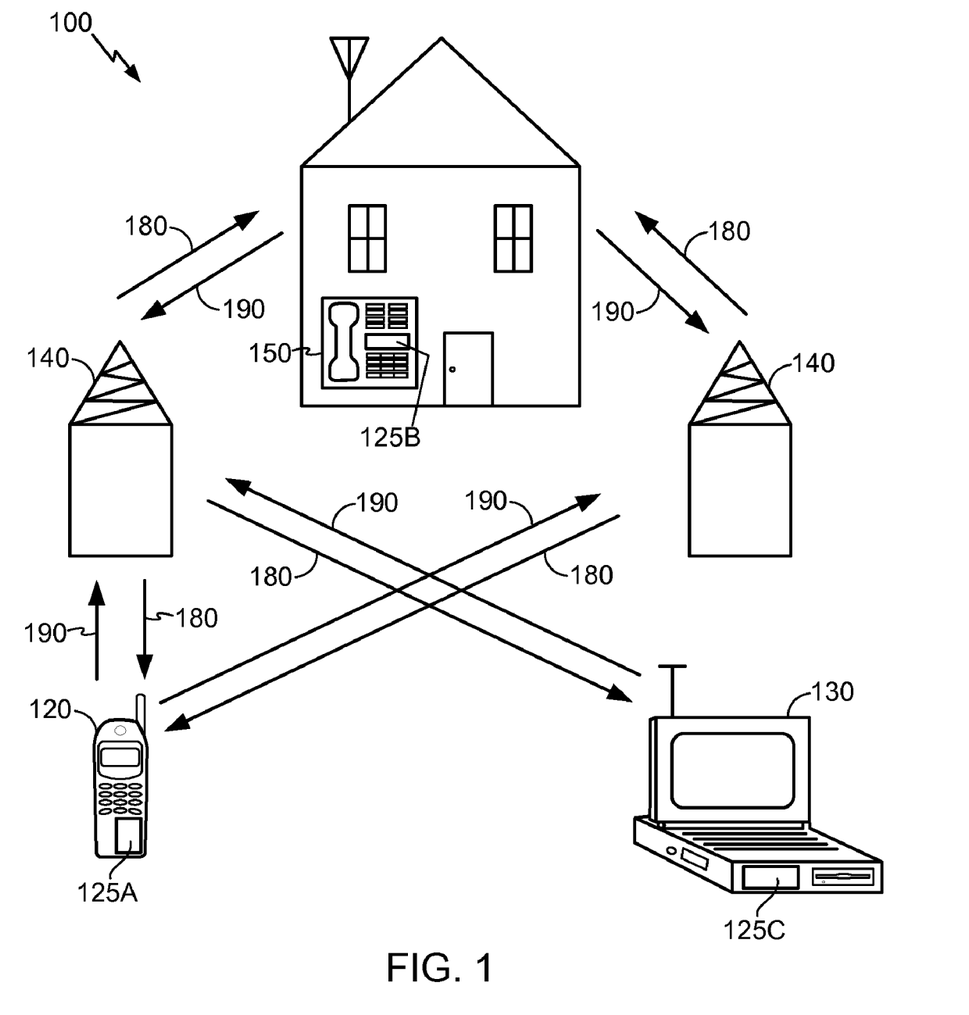
FIG. 1 illustrates a wireless communication system.

FIG. 1 illustrates an exemplary wireless communication system 100 in which an embodiment of the invention may be advantageously employed. For purposes of illustration, FIG. 1 shows three remote units 120, 130, and 150 and two base stations 140. It will be recognized that common wireless communication systems may have many more remote units and base stations. Remote units 120, 130, and 150 include hardware components, software components, or both as represented by components 125A, 125B, and 125C, which have been adapted to embody the invention as discussed further below. FIG. 1 shows forward link signals 180 from the base stations 140 and the remote units 120, 130, and 150 and reverse link signals 190 from the remote units 120, 130, and 150 to base stations 140.

In FIG. 1, remote unit 120 is shown as a mobile telephone, remote unit 130 is shown as a portable computer, and remote unit 150 is shown as a fixed location remote unit in a wireless local loop system. By way of example, the remote units may alternatively be cell phones, pagers, walkie talkies, hand-held personal communication systems (PCS) units, portable data units such as personal data assistants, or fixed location data units such as meter reading equipment. Although FIG. 1 illustrates remote units according to the teachings of the disclosure, the disclosure is not limited to these exemplary illustrated units. Embodiments of the invention may be suitably employed in any device having a processor with at least two levels of a memory hierarchy, such as a level 1 cache and a level 2 cache as described in further detail below.

A cache may comprise a content addressable memory (CAM) coupled to a random access memory (RAM). The cache is accessed by comparing a memory address with addresses stored in the CAM. If the memory address matches a CAM address, the cache indicates a "hit" and may additionally provide a line of data or instructions from a location in the RAM that corresponds to the matching CAM address. If the memory address does not match with any address stored in the CAM, the cache indicates a "miss". A miss may occur on an instruction or data unit access anywhere in a cache line. When a miss occurs, a line in the cache is generally replaced with a new line containing the missed instruction or data. A miss in a first level cache generally triggers an L2 cache access, which requires a greater number of processing cycles than a first level cache access. A miss in the L2 cache triggers an access to system memory, which incurs an even greater delay.

The process to determine whether or not an address hits in the cache by use of the CAM address comparison is relatively power efficient. However, retrieving instructions or data from the cache RAM in the event of a hit is relatively power inefficient. Accordingly, a processor may utilize a prefetch operation in an instruction cache to ascertain whether or not desired instructions are stored in the cache without incurring the power penalty of actually retrieving instructions at the time of the cache access. As used herein, the term "prefetch" or "prefetch operation" refers to a limited cache access that yields a hit or a miss without retrieving instructions or data from the cache. A prefetch operation generally accesses the contents of the cache's CAM but not the contents of the cache's RAM. As used herein, the term "fetch" or "fetch operation" refers to a memory operation that includes a cache access that yields a hit or a miss and retrieves instructions or data from the cache on a hit. A fetch operation accesses the cache's CAM and the cache's RAM and the accessed instruction is intended for execution.

Instruction prefetching involves performing instruction cache CAM address comparisons based on instruction stream processing. For example, when a miss occurs on an instruction located anywhere in a cache line, the cache line is fetched and the next sequential cache line may be prefetched. This technique of always prefetching the next cache line is based on an assumption that the next cache line contains instructions that will shortly be needed. However, the locality principle of sequential access of instructions of course fails at some point in a program, for example, due to branches, calls, returns, interrupts, or the like. As one example, an interrupt, due to exceptional conditions or external events, stops the normal instruction stream processing and forces a redirection to an interrupt handler corresponding to the event that caused the interrupt. An interrupt vector table is one technique that may be used to establish correspondence of an interrupt event with an interrupt handler. When an interrupt vector table is fetched from cache, the conventional technique of always prefetching the next cache line fetches instructions that may not be used and consequently causes unnecessary loss of memory access bandwidth, increases power use, and lowers processor performance.

In addition to fetch and prefetch operations, a "speculative interrupt prefetch" operation and a "speculative interrupt fetch without execute" operation are defined for instruction cache operations in accordance with the present invention. A speculative interrupt prefetch is a limited cache access that yields a hit or a miss without retrieving instructions from the instruction cache on a "hit" indication. The instruction is speculatively prefetched based on a detected exceptional condition resulting from failed execution of an instruction. The instruction is speculatively prefetched prior to being certain that the instruction will take the associated interrupt. It is noted that in many cases, a plurality of instructions, such as the instructions residing in an instruction cache line, may be speculatively prefetched. The process to determine when to utilize a speculative interrupt prefetch operation in accordance with the present invention is described in further detail below.

A speculative interrupt fetch without execute operation is a memory operation that includes an instruction cache access that yields a hit or a miss and retrieves the instruction from the instruction cache on a hit or from higher-level memory on a miss. The instruction is speculatively fetched based on a detected exceptional condition in order to determine the type of instruction at the speculative fetch address, and, if the instruction is determined to be a PC-relative branch, the specified offset from the program counter is calculated as a branch target address. The speculatively fetched instruction is not executed. The process to determine when to utilize a speculative interrupt fetch without execute operation in accordance with the present invention is described in further detail below. It is noted that in many cases, a plurality of instructions, such as the instructions residing in an instruction cache line, may be speculatively fetched without execute.

Figure 2:
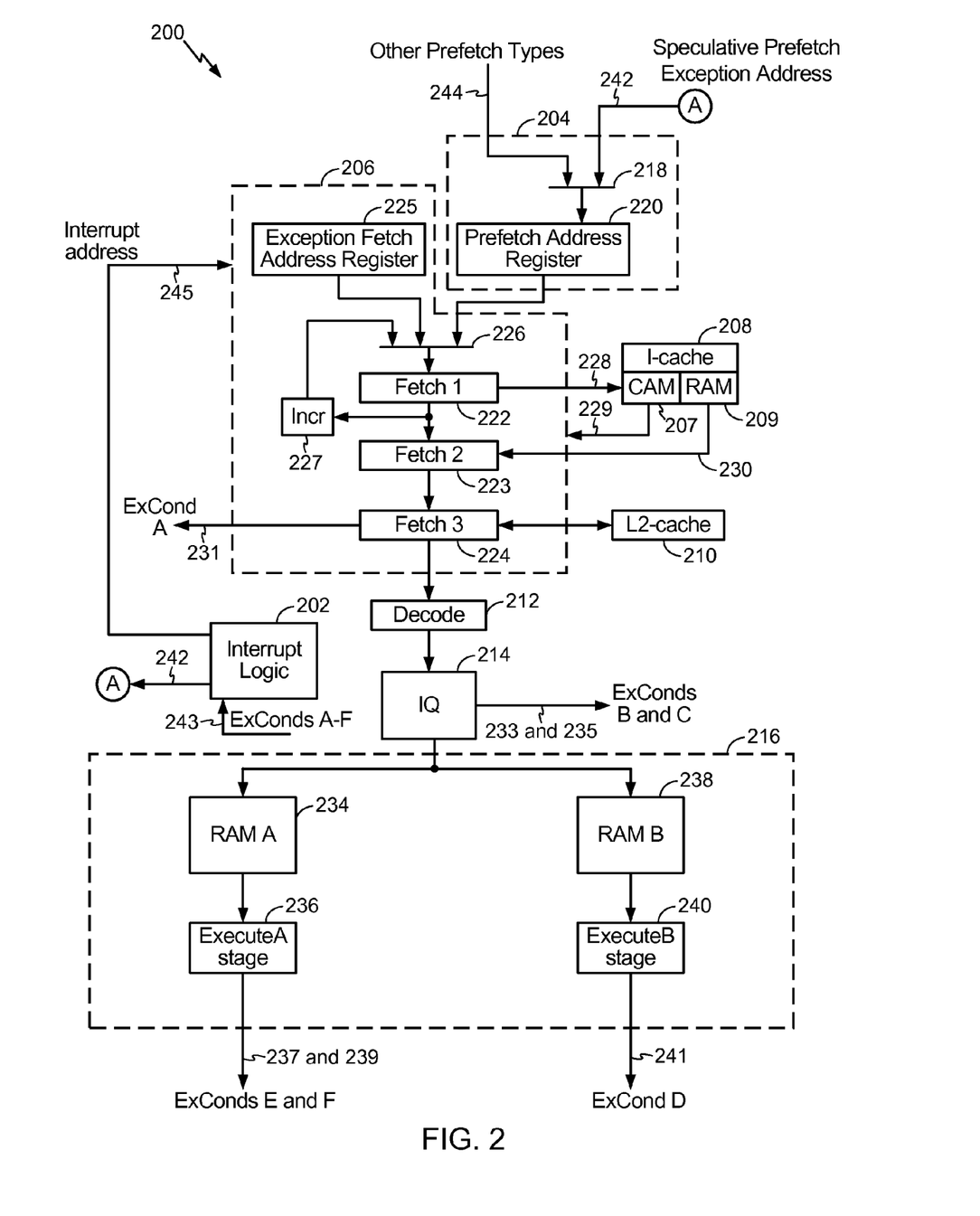
FIG. 2 is a first functional block diagram of an exemplary first processor and memory complex which supports speculative interrupt address prefetching utilizing independent interrupt vector addresses.

FIG. 2 is a first functional block diagram of an exemplary first processor and memory complex 200 which supports speculative interrupt address prefetching utilizing independent interrupt vector addresses. The first processor and memory complex 200 includes interrupt logic circuitry 202, prefetch logic circuitry 204, fetch logic circuitry 206, a level one (L1) instruction cache (I-cache) 208, a level 2 cache (L2-cache) 210, decode logic circuitry 212, an instruction queue (IQ) 214, and execution pipeline stage logic circuitry 216.

The prefetch logic circuitry 204 includes a multiplexer 218 and a prefetch address register 220. The fetch logic circuitry 206 includes a number of fetch stages, such as fetch-1 stage 222, fetch-2 stage 223, fetch-3 stage 224, and related logic circuitry such as an exception fetch address register 225, multiplexer 226, and incrementer (Incr) 227 used to calculate sequential addresses. The L1 I-cache 208 includes a content addressable memory (CAM) unit 207, a random access memory (RAM) unit 209, a fetch access interface 228 to the CAM unit 207, hit or miss (H/M) logic circuitry internal to the CAM unit 207 to generate an H/M signal 229, and an instruction bus 230 coupled to the RAM unit 209 which provides a fetched instruction or instructions on a "hit". The fetch-3 stage 224 may produce a first exceptional condition (ExCond) A 231, such as a prefetch abort signal. The instruction queue (IQ) 214 is utilized to queue instructions and distribute them to the execution pipeline and may generate exceptional conditions (ExConds) B and C 233 and 235, such as an undefined instruction detected signal and a data abort signal, respectively.

The fetch 1 stage 222 is utilized to access the CAM unit 207 of the L1 I-cache 208 through the fetch access interface 228 as a first step in an instruction fetch operation. The fetch 2 stage 223 is utilized to access the RAM unit 209 of the L1 I-cache 208 as a second step in the instruction fetch operation. The fetch 3 stage 224 is utilized to analyze the data as a line of instructions returned from the L1 I-cache 208 on a "hit" and to split the data into individual instructions. Also, the fetch 3 stage 224 processes whether an instruction fetch operation missed. Upon a miss and the type of miss being detected, the fetch 3 stage 224 sends requests to higher levels of storage above the L1 I-cache 208, such as the L2-cache 210.

Instructions are decoded in decode logic circuitry 212 and queued in queue logic circuitry 214 for distribution to the appropriate execution pipeline. The execution pipeline stage logic circuitry 216 is made up of, for example, pipeline-A operations, such as arithmetic and related instruction operations, and pipeline-B operations, such as memory access and related instruction operations. In particular, random access memory (RAM) pipeline A stage 234 refers to general purpose register (GPR) file accesses by the A operations. Execute A stage 236 executes instructions dispatched to pipeline-A and may produce exceptional conditions (ExConds) E and F 237 and 239, respectively, such as a supervisor call signal and a monitor call signal, respectively. RAM pipeline B stage 238 refers to GPR file accesses by the B operations. Execute B stage 240 executes instructions dispatched to pipeline-B and may produce exceptional condition (ExCond) D 241, such as a data alignment abort signal. It is noted that instructions may be compared at the time an exceptional condition is detected by their relative position in the processor pipeline, such that a first instruction is generally considered older than a second instruction if the first instruction is deeper in the pipeline than the second instruction. Pipeline hold situations, for example, which may affect such a comparison, are accounted for by the interrupt logic circuitry 202.

Interrupt logic circuitry 202 tracks the status of prior instructions including the exceptional conditions (ExConds) A-F 243 received from various pipeline stages to determine whether the prior instructions are able to complete without a fault. For example, when a pipeline stage reports that an instruction that it contains has an exception, that pipeline stage may hold operations until a pipeline flush occurs. The interrupt logic circuitry 202 examines the pipeline stages that are reporting exceptions. Within a matrix of pipeline events, it is determined whether the pipeline stage that detected the exception contains the oldest uncommitted instruction by the lack of any older uncommitted instructions currently present in the matrix. Basically, the interrupt logic circuitry 202 provides a speculative prefetch exception address 242 based on a prioritization of exceptional conditions that are present, as described in more detail below with regard to FIG. 6. The interrupt logic 202 also provides an interrupt address 245 to the exception fetch address register 225 based on a combination of pipeline information and the prioritization of the exceptional conditions that are present.

Peripheral devices and system memory which may typically be connected to the first processor and memory complex 200, are not shown for clarity of discussion. The first processor and memory complex 200 may be suitably employed in various embodiments of the invention, such as components 125A-C for executing program code that is stored in the instruction caches 208 and 210, for example.

When executing program code, the first processor and memory complex 200 may encounter one or more exceptional conditions, such as exceptional conditions 231, 233, 235, 237, 239, or 241. When an exceptional condition is detected, it is prioritized and a speculative prefetch exception address 242 is generated and used in the execution of a prefetch operation as described in further detail below with regard to FIG. 3. The contents of the exception fetch address register 225 are not valid until a point in time is reached in which a determination may be made that the interrupt is going to be processed as noted in block 306 below. In general, there are other situations within the first processor and memory complex 200 which may take advantage of prefetch operations. In FIG. 2, input 244 is provided for other prefetch types, which may be software-based or hardware-based to address such situations.

Figure 3:
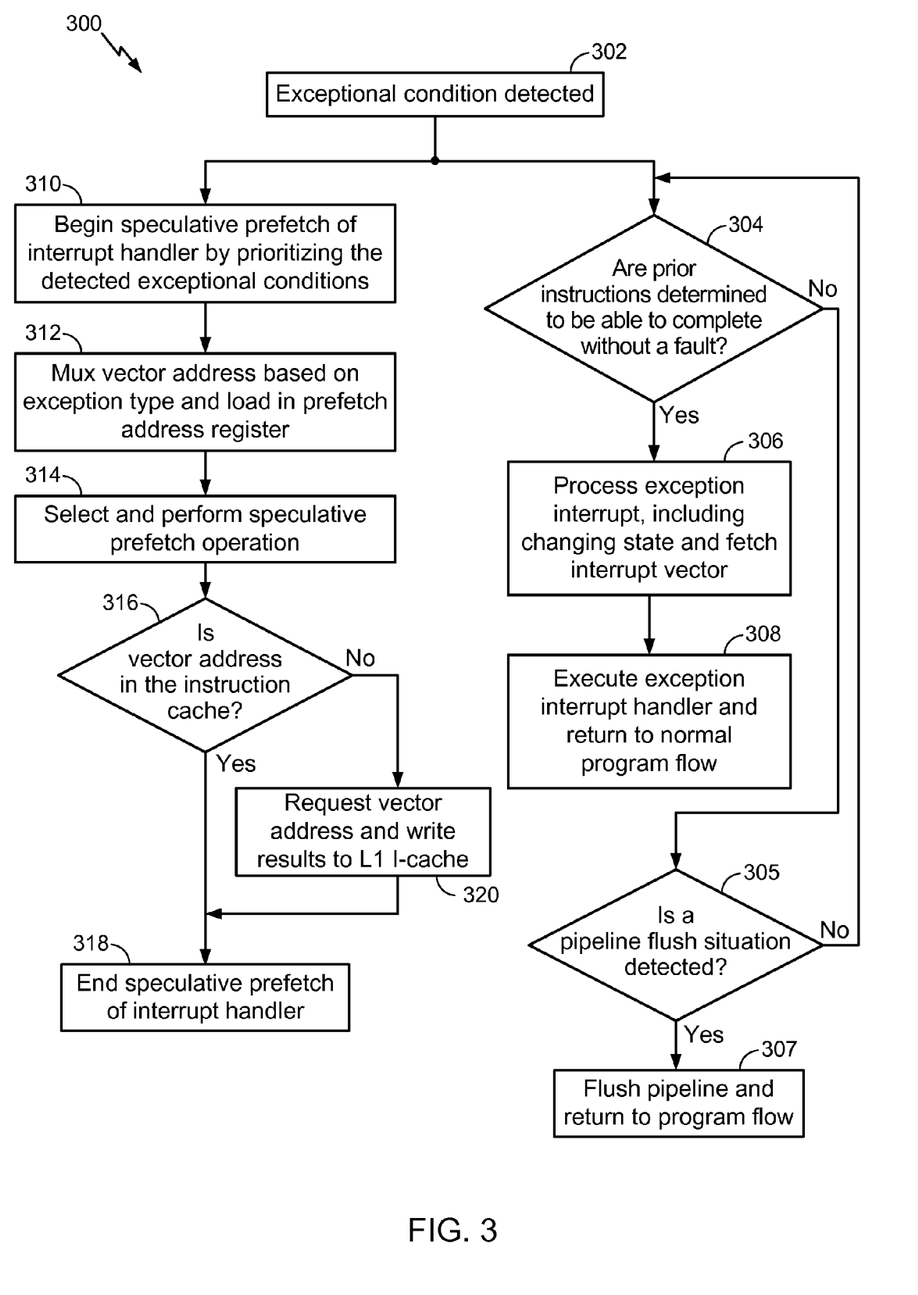
FIG. 3 is a first flow diagram illustrating a first process for speculative interrupt prefetching based on the first functional block diagram of FIG. 2.

FIG. 3 is a first flow diagram illustrating a first process 300 for speculative interrupt prefetching utilizing a system such as that of FIG. 2. The first process 300 begins at block 302 with an exceptional condition being detected in the first processor and memory complex 200. At decision block 304, a determination is made as to whether prior instructions are able to complete without a fault. Due to the length of the pipeline and the type of instructions in the pipeline, such a determination may take a number of cycles during which time the "No" leg of the decision block 304 is followed. For example, a load instruction could be in the pipeline and the operation to fetch data for the specified load may experience a miss in a level 1 data cache, a miss in the L2-cache 210, and may have to access system memory in order to retrieve the specified data. Such a sequence of operations may require many hundreds of cycles in order to complete.

The load instruction may complete execution without a fault as noted above or may itself cause another exception to occur. Pipeline logic circuitry determines whether the load instruction of this example is an older instruction than the instruction that caused the initial exceptional condition detection at block 302. If the load instruction is an older instruction, the older load instruction would cause newer instructions in the pipeline, including the instruction that caused the initial exception, to be flushed. At decision block 305, if a pipeline flush situation is not detected, the first process 300 returns to decision block 304. At decision block 305, if a pipeline flush is detected, the first process 300 proceeds to block 307. At block 307, the pipeline is flushed and the first process 300 returns to the program flow.

At block 306, after a positive determination of the condition at decision block 304 has been made, an interrupt is accepted for processing in which processor state is changed and the address of the interrupt handler is fetched. At block 308, the interrupt handler associated with the interrupt is executed and at completion of the interrupt handler, the first process 300 returns to normal program flow.

Rather than wait for the determination of decision block 304 to be made, a parallel set of operations may advantageously begin at block 310. At block 310, a speculative prefetch of the interrupt handler begins by prioritizing the detected exceptional conditions. At block 312, based on the type of exceptional condition, such as the type of one of the exceptional conditions 231, 233, 235, 237, 239, or 241, an interrupt vector address is selected by multiplexer 218, loaded into the prefetch address register 220, and a speculative prefetch operation is requested. At block 314, the requested speculative prefetch operation is selected by multiplexer 226 and a fetch-1 stage 222 operation is started returning a hit or miss indication without fetching the instruction by accessing only the CAM portion of the L1 I-cache 208. At decision block 316, based on the fetch-1 stage 222 operation having a "hit", the "Yes" leg of decision block 316 is followed to block 318 indicating the instruction at the interrupt vector address is present in the L1 I-cache 208. If the prefetch operation at fetch-1 stage 222 returns a miss, the decision block 316 proceeds to block 320 to request the instruction at the interrupt vector address from higher-level memory, such as from the L2 cache or from system memory. Once returned, the cache line containing the requested instruction is written into the L1 I-cache 208. It is noted that the interrupt vector addresses for the various exceptional conditions are unique addresses that either may be based on architecture definition or that may be programmable by software. After the instruction at the interrupt vector address has been prefetched and loaded into the L1 I-cache 208, the first process 300 proceeds to block 318, generally prior to the first processor and memory complex 200 accepting the interrupt in response to the detected exceptional condition. At block 318, the speculative prefetch of the interrupt handler is ended and the first processor and memory complex 200 returns to normal program flow.

Figure 4:
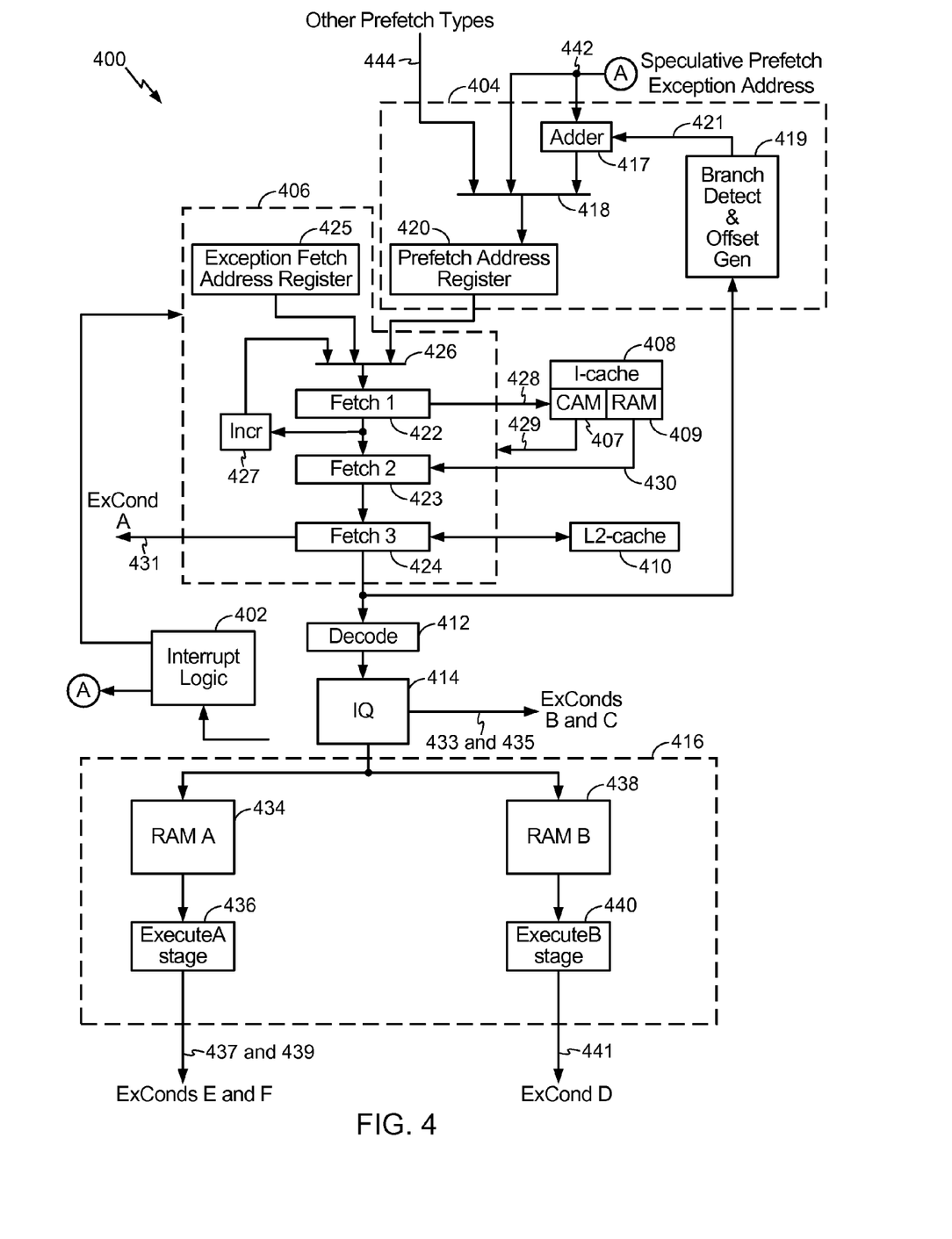
FIG. 4 is a second functional block diagram of an exemplary second processor and memory complex which supports speculative interrupt address prefetching utilizing interrupt addresses developed from an interrupt vector table.

FIG. 4 is a second functional block diagram of an exemplary second processor and memory complex 400 which supports speculative interrupt address prefetching. This approach utilizes interrupt addresses stored in an interrupt vector table. The second processor and memory complex 400 includes interrupt logic circuitry 402, prefetch logic circuitry 404, fetch logic circuitry 406, an instruction cache (I-cache) 408, a level 2 cache (L2-cache) 410, decode logic circuitry 412, an instruction queue (IQ) 414, and execution pipeline stage logic circuitry 416.

The prefetch logic circuitry 404 includes an adder 417, a multiplexer 418, branch detect and offset generation logic circuitry 419, and a prefetch address register 420. The fetch logic circuitry 406 includes a number of fetch stages, such as fetch-1 stage 422, fetch-2 stage 423, fetch-3 stage 424, and related logic circuitry such as an exception fetch address register 425, multiplexer 426, and incrementer (Incr) 427. The I-cache 408 includes a fetch access interface 428, hit or miss (H/M) logic circuitry internal to the I-cache to generate an H/M signal 429, and an instruction fetch function internal to the I-cache which provides a fetched instruction or instructions on a "hit" on I-cache bus 430. The fetch-3 stage 424 may produce exceptional condition (ExCondA) output 431, such as a prefetch abort signal. The instruction queue (IQ) 414 is utilized to queue instructions and distribute them to the execution pipeline and may generate exceptional condition (ExConds) B and C outputs 433 and 435, such as an undefined instruction detected signal and a data abort signal, respectively.

The execution pipeline stage logic circuitry 416 is made up of, for example, pipeline-A operations, such as arithmetic and related instruction operations, and pipeline-B operations, such as memory access and related instruction operations. In particular, random access memory (RAM) pipeline-A stage 434 refers to general purpose register (GPR) file accesses by the A operations. Execute A stage 436 executes instructions dispatched to pipeline-A and may produce exceptional condition (ExConds) E and F outputs 437 and 439, such as a supervisor call signal and a monitor call signal, respectively. RAM pipeline-B stage 438 refers to GPR file accesses by the B operations. Execute B stage 440 executes instructions dispatched to pipeline-B and may produce exceptional condition (ExCond) D output 441, such as a data alignment abort signal. Interrupt logic circuitry 402, in a similar manner to interrupt logic circuitry 202, tracks status of prior instructions to determine whether the prior instructions are able to complete without a fault.

Peripheral devices and system memory which may connect to the second processor and memory complex 400, are not shown for clarity of illustration and discussion. The second processor and memory complex 400 may be suitably employed in various embodiments of the invention in components 125A-C for executing program code such as may be stored in the caches 408 and 410, for example.

When executing program code, the processor and memory complex 400 may encounter one or more exceptional conditions, such as exceptional conditions 431, 433, 435, 437, 439, or 441. When an exceptional condition is detected, it is prioritized and in accordance with the present invention, a speculative prefetch exception address 442 is generated to be used in the execution of a prefetch operation as described in further detail below with regard to FIG. 5. In general, there are other situations within the second processor and memory complex 400 which may take advantage of prefetch operations, such as through software which triggers a prefetch of an expected cache line to improve performance. These other situations are indicated by the other prefetch types 444.

Figure 5:
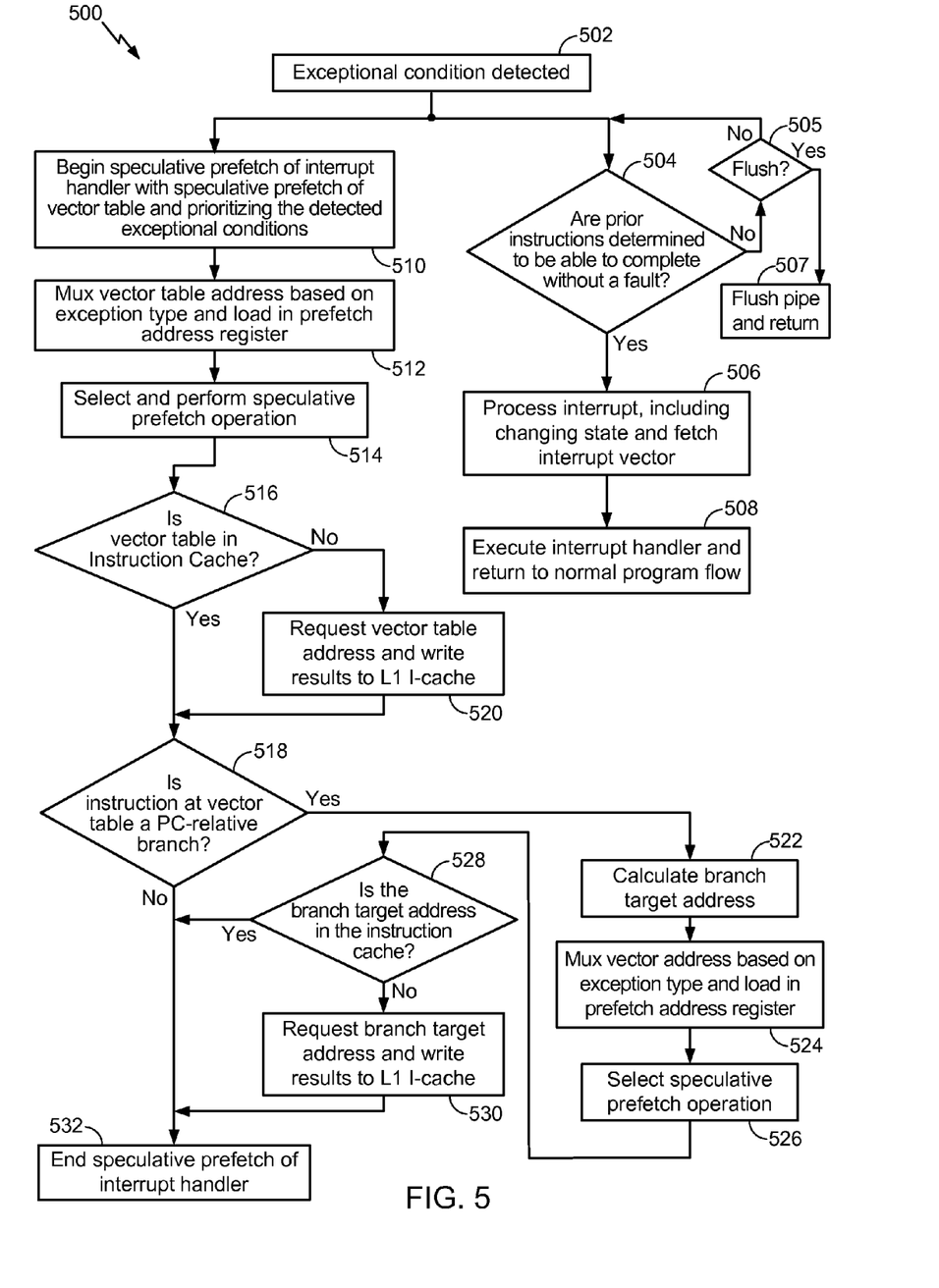
FIG. 5 is a second flow diagram illustrating a second process for speculative interrupt prefetching based on the second functional block diagram of FIG. 4.

FIG. 5 is a second flow diagram illustrating a second process 500 for speculative interrupt prefetching based on the second functional block diagram of FIG. 4. The second process 500 begins at block 502 with an exceptional condition being detected in the second processor and memory complex 400. At decision block 504, a determination is made as to whether prior instructions are able to complete without a fault. Due to the length of the pipeline and the type of instructions in the pipeline, such a determination may take a number of cycles during which time the "No" leg of the decision block 504 is followed. For example, a load instruction could be in the pipeline and the operation to fetch data for the specified load may experience a miss in a level 1 data cache (not shown), a miss in the L2-cache 410, and may have to access system memory in order to retrieve the specified data. Such a sequence of operations may require many hundreds of cycles in order to complete. At block 506, after the determination of decision block 504 has been made, an interrupt is accepted for processing including changing processor state and fetching the address of the interrupt handler. At block 508, the interrupt handler associated with the interrupt is executed and at completion of the interrupt handler, the second process 500 returns to normal program flow.

Rather than wait for the determination of decision block 504 to be made, a parallel set of operations advantageously begins at block 510. At block 510, a speculative prefetch of the interrupt handler begins with a speculative prefetch of a vector table and a prioritization of the exceptional conditions. At block 512, based on the type of exceptional condition, such as exceptional conditions 431, 433, 435, 437, 439, or 441, an interrupt vector table address is selected by multiplexer 418, loaded into the prefetch address register 420, and a fetch without execute operation is requested. For example, a fetch instruction operation comprises a fetch 1 stage 422 operation and a fetch 2 stage 423 operation to occur causing an instruction or instructions to be read from the I-cache 408 RAM. The specific fetched instruction would then be passed to decode stage 412 to begin the execution operations. A fetch without execute operation comprises a fetch 1 stage 422 operation and a fetch 2 stage 423 operation to occur which would read an instruction or instructions from the I-cache 408 RAM. However, in this fetch without execute case, the specific fetched instruction would not be passed to the decode stage 412. Rather, the specific fetched instruction would be examined to determine whether it is a PC-relative branch instruction. Such pipeline operations may be controlled by tracking attributes of the fetch operations indicating, for example, a fetch operation, a prefetch operation, or a fetch without execute operation attributes.

At block 514, the requested fetch without execute operation is selected by multiplexer 426 and a fetch-1 stage 422 operation is started returning a "hit" or "miss" indication. At decision block 516, based on the fetch-1 stage 422 operation having a "hit", the "Yes" leg of decision block 516 is followed to decision block 518 indicating the interrupt vector table is in the I-cache 408 and returning the instruction at the address associated with the exceptional condition. The fetch operation performed at block 514 is an advantageous fetch without execute operation that is used to determine the type of instruction that is fetched. If the fetch without execute operation at fetch-1 stage 422 returns a miss, the decision block 516 proceeds to block 520 to request the contents of the interrupt vector table from higher level memory, for example from the L2-cache 410. During the access of the interrupt vector table, the instructions within the table are also obtained, including the instruction at the vector address associated with the exceptional condition. The instruction at the address within the interrupt vector table associated with the particular exception type is generally a PC-relative branch instruction. The use of a PC-relative branch instruction allows an interrupt handler associated with an exceptional condition to be located anywhere within the memory space of the second processor and memory complex 400 within the limits specified by the processor architecture. After the instruction at the vector address has been speculatively fetched without execute and loaded into the I-cache 408, the second process 500 proceeds to decision block 518.

At decision block 518, the instruction at the address associated with the exception condition is checked to determine whether it is a program counter (PC) relative branch instruction. Such a determination may be made in branch detect and offset generation block 419. If the instruction is not a PC-relative branch instruction, the second process 500 proceeds to block 532. At block 532, the speculative prefetch of the interrupt handler is ended and the second processor and memory complex 400 returns to normal program flow.

Returning to decision block 518, if the instruction is a PC-relative branch instruction, the second process 500 proceeds to block 522. At block 522, the branch target address is calculated by adding an address offset value 421 to the speculative prefetch exception address 442 in adder 417, which generates the branch target address for the multiplexer 418. It is noted that adder 417 could be a pre-existing adder that may be used for this additional purpose, thereby minimizing hardware requirements to implement this invention. At block 524, the multiplexer 418 selects the adder output to be loaded into the prefetch address register 420. At block 526, a speculative prefetch of the instruction at the branch target address is selected in fetch-1 operation 422. At decision block 528, a determination is made whether the instruction at the branch target address is present in the I-cache 408. If the speculative prefetch operation returns a hit indication, with no instruction being fetched, the determination is positive that an instruction is present at the branch target address indicating at least the first instruction of an interrupt handler associated with the exception condition is in the I-cache 408. The second process 500 then proceeds to block 532, generally prior to the second processor and memory complex 400 accepting the interrupt in response to the detected exceptional condition, to end the speculative prefetch of the interrupt handler.

Returning to decision block 528, if the speculative prefetch operation returns a miss indication, the determination indicates the instruction at the branch target address is not present in the I-cache 408. At block 530, the instruction at the branch target address is requested from higher-level memory, such as from the L2 cache or from system memory. Once the cache line containing the instruction at the branch target address is loaded into the I-cache 408, the second process 500 proceeds to block 532 to end the speculative prefetch of the interrupt handler.

Figure 6:
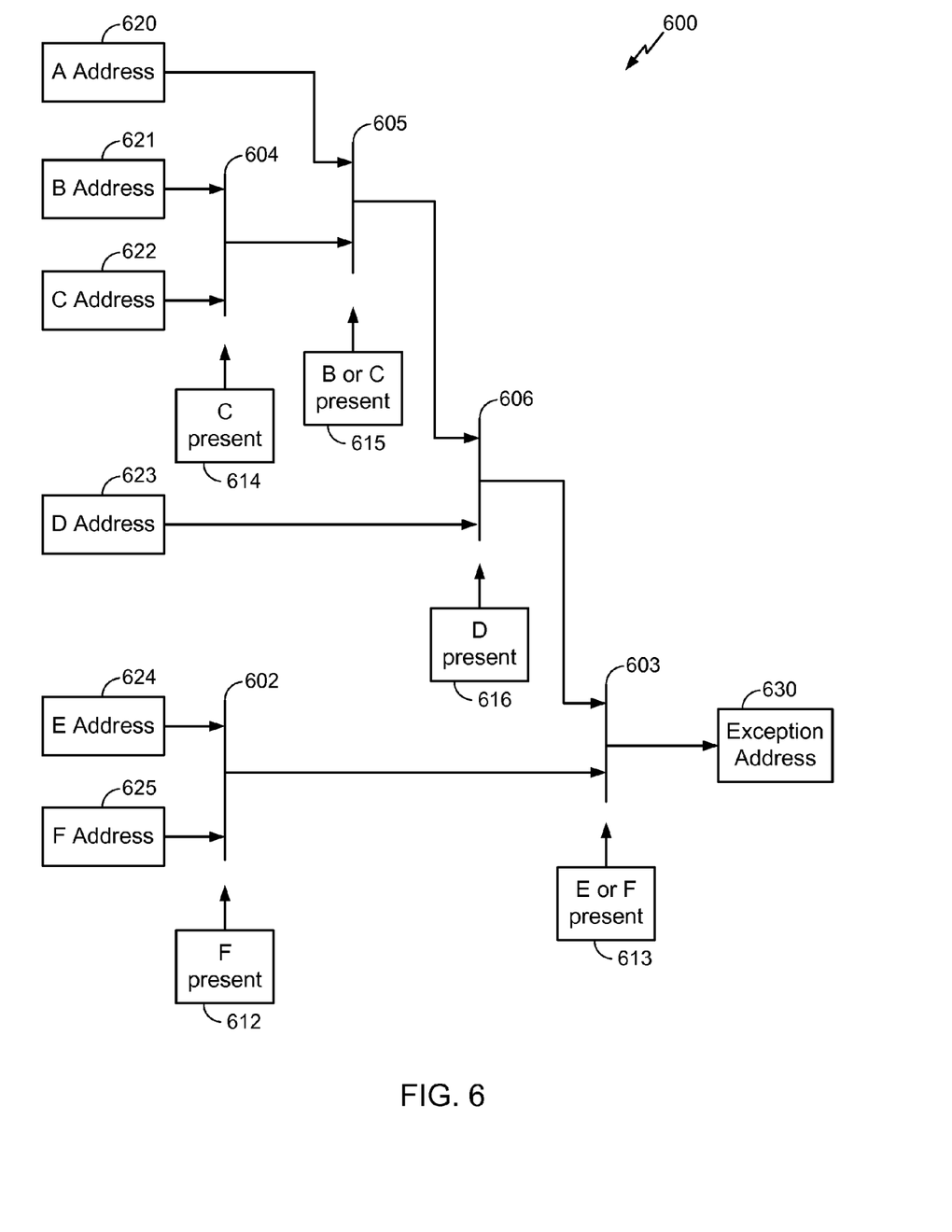
FIG. 6 illustrates an exemplary priority exception logic circuitry that may suitably be used to generate interrupt vector addresses based on predetermined priorities of the exceptional conditions.

FIG. 6 illustrates an exemplary priority exception logic circuitry 600 that may suitably be used to generate interrupt vector addresses based on predetermined priorities of the exceptional conditions. For example, exceptional conditions A-F may be prioritized with exceptional condition F being the highest priority and in priority order F, E, D, C, B, with exceptional condition A being the lowest priority. The priority exception logic circuitry 600 includes a set of selectors, illustrated by multiplexers 602-606, which respond to selection indications 612-616, respectively. Addresses associated with each exceptional condition are generally predetermined by the processor architecture and provided by a processor and memory complex, such as either the first or second processor and memory complexes 200 or 400, respectively. The addresses associated with exceptional conditions A-F are stored, for example, in storage cells 620-625, respectively which may be special purpose registers that are identified by the processor architecture. The interrupt vector address based on predetermined priorities of the exceptional conditions is stored in storage cell 630.

Selection indications 612-616 are set by detection logic circuitry within the processor and memory complex. For example, when exceptional condition F is detected, the selection indication 612 would be enabled. If exceptional condition F is present, then exceptional condition E or F present selection indication 613 would also be enabled, passing the address associated with exceptional condition F from storage cell 625 through multiplexers 602 and 603 to the exception address storage cell 630. If the exceptional condition F is not present, then the address associated with exceptional condition E from storage cell 624 is selected by multiplexer 602. If exceptional condition E is detected, then the exceptional condition E or F present indication 613 would be enabled, passing the address associated with exceptional condition E from storage cell 624 through multiplexers 602 and 603 to the exception address storage cell 630.

If neither of the exceptional conditions E or F is detected, then the next priority exceptional conditions may be determined. For example, if exceptional condition A and C are detected, but exceptional conditions B, D, E, or F are not detected, then selection indication C present 614 and selection indication B or C present 615 would be enabled, allowing the address of exceptional condition C from storage cell 622 to pass through multiplexers 604, 605, 606 and 603 to the exception address storage cell 630. It is noted that once an exceptional condition is handled by an exception interrupt, the selection signal for that exceptional condition is disabled. Any lower priority exception conditions, which may have been pending, are cancelled out due to a pipeline flush that is associated with the exception interrupt. Exceptional conditions may be detected again if the instructions associated with those exceptional conditions flow back through the pipeline. In such a situation, any exception detection would be treated as a new detection situation.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic components, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, for example, a combination of a DSP and a microprocessor, a plurality of microprocessors, one or more microprocessors in conjunction with a DSP core, or any other such configuration appropriate for a desired application.

The methods described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

While the invention is disclosed in the context of illustrative embodiments for an instruction cache in a hierarchical memory environment, it will be recognized that a wide variety of implementations may be employed by persons of ordinary skill in the art consistent with the above discussion and the claims which follow below.

What is claimed is:

1. A method for interrupt processing comprising:
   detecting an exceptional condition resulting from a failed execution of an instruction in one or more stages of an instruction pipeline in a processor;
   checking an instruction cache for the presence of an instruction at a starting address of an interrupt handler in response to the detected exceptional condition and prior to the processor accepting an interrupt in which the instruction at the starting address of the interrupt handler is fetched in response to the detected exceptional condition; and
   prefetching the instruction at the starting address of the interrupt handler from storage other than the instruction cache when the instruction is not present in the instruction cache to load the instruction in the instruction cache, whereby the instruction is made available in the instruction cache by the time the processor accepts the interrupt in response to the detected exceptional condition.

2. The method of claim 1 further comprising:
   evaluating in parallel another instruction being processed in the instruction pipeline to determine whether the other instruction is able to complete without a fault indication, wherein the other instruction is an older instruction than the instruction for which the exceptional condition was detected.

3. The method of claim 2 further comprising:
   processing the interrupt in response to the exceptional condition upon a determination that the older instruction is able to complete without a fault indication, whereby the interrupt handler is executed and the processor returns to normal program flow.

4. The method of claim 2 further comprising:
ending the checking and prefetching steps upon a determination that the older instruction is not able to complete without a fault indication.

5. The method of claim 1 further comprising:
prioritizing the exceptional condition among a plurality of detected exceptional conditions; and
selecting a special purpose register holding an interrupt vector address that is the starting address of the interrupt handler associated with the prioritized exceptional condition.

6. The method of claim 5 further comprising:
storing the interrupt vector address from the selected special purpose register in a prefetch address register; and
prefetching the instruction at the address stored in the prefetch address register.

7. The method of claim 1 wherein checking for the presence of an instruction at a starting address of an interrupt handler in an instruction cache comprises:
reading a content addressable memory portion of the instruction cache at the starting address; and
generating an indication whether the instruction is present or not present in the instruction cache without reading a random access memory portion of the instruction cache.

8. A method for interrupt processing utilizing an interrupt vector table, the method comprising:
detecting an exceptional condition in one or more stages of an instruction pipeline in a processor;
checking an instruction cache for the presence of an instruction at a vector address held in an interrupt vector table in response to the detected exceptional condition and prior to the processor accepting an interrupt in which the instruction at the vector address is fetched in response to the detected exceptional condition; and
prefetching the instruction from storage other than the instruction cache when the instruction is not present in the instruction cache to load the instruction and the vector table in the instruction cache.

9. The method of claim 8 further comprising:
calculating a branch target address of an interrupt handler associated with the detected exceptional condition upon determining the instruction is a program counter relative branch instruction;
checking the instruction cache for the presence of an interrupt handler instruction at the branch target address; and
prefetching the interrupt handler instruction at the branch target address from storage above the instruction cache when the interrupt handler instruction is not present in the instruction cache to load the interrupt handler instruction in the instruction cache, whereby the instruction is made available in the instruction cache by the time the processor accepts the interrupt in response to the detected exceptional condition.

10. The method of claim 8 further comprising:
evaluating in parallel other instructions being processed in the instruction pipeline to determine whether another instruction is able to complete without a fault indication, wherein the other instruction is an older instruction than the instruction for which the exceptional condition was detected.

11. The method of claim 10 further comprising:
processing the interrupt in response to the exceptional condition upon a determination that the older instruction is able to complete without a fault indication, whereby the interrupt handler is executed and the processor returns to normal program flow.

12. The method of claim 10 further comprising:
ending the steps to ensure the interrupt handler instruction is present in the instruction cache upon a determination that the older instruction is not able to complete without a fault indication.

13. The method of claim 8 further comprising:
prioritizing the exceptional condition among a plurality of detected exceptional conditions; and
selecting a special purpose register holding an interrupt vector table address that is an address of a program counter relative branch instruction associated with the prioritized exceptional condition.

14. The method of claim 13 wherein the instruction is a program counter (PC) relative branch instruction.

15. The method of claim 8 further comprising:
fetching the instruction from the instruction cache when the instruction is present in the instruction cache without executing the instruction.

16. A processor with interrupt processing logic comprising:
exception detection logic circuitry operable at various stages of a processor pipeline to detect one or more exceptional conditions;
prioritization logic circuitry operable to generate an exception vector address based on a predetermined priority for the highest priority detected exceptional condition selected from one or more detected exceptional conditions;
first logic circuitry operable to check an instruction cache for the presence of an instruction at the exception vector address in response to the selected exceptional condition and prior to the processor accepting an interrupt in response to the detected exceptional condition; and
second logic circuitry operable to prefetch the instruction at the exception vector address in storage above the instruction cache when the instruction is not present in the instruction cache in order to load the instruction in the instruction cache, whereby the instruction is made available in the instruction cache by the time the processor accepts the interrupt in response to the detected exceptional condition.

17. The processor of claim 16 wherein the instruction at the exception vector address is a starting address of an interrupt handler associated with the highest priority detected exceptional condition.

18. The processor of claim 16 wherein the instruction at the exception vector address is an instruction held in an interrupt vector table associated with the highest priority detected exceptional condition.

19. The processor of claim 18 further comprising:
third logic circuitry for calculating a branch target address of an interrupt handler associated with the highest priority detected exceptional condition upon determining the instruction is a program counter (PC) relative branch instruction;
fourth logic circuitry for checking the instruction cache for the presence of an interrupt handler instruction at the branch target address; and
fifth logic circuitry for prefetching the interrupt handler instruction at the branch target address in storage above the instruction cache when the interrupt handler instruction is not present in the instruction cache to load the interrupt handler instruction in the instruction cache.

20. The processor of claim 19 wherein the third logic circuitry comprises:
- a branch detect and offset generator having logic circuitry to determine the instruction is a PC-relative branch instruction and to generate an address offset; and
- an adder to generate a branch target address utilizing the address offset.

21. The processor of claim 16 further comprising:
an instruction cache comprising:
- a random access memory (RAM) portion for holding a plurality of program instructions; and
- a content addressable memory (CAM) portion for holding addresses associated with the program instructions, the CAM portion which may be accessed with an address to generate an indication whether an instruction associated with the address is present or not present in the RAM portion of the instruction cache without reading the RAM portion of the instruction cache.

22. The processor of claim 16 further comprising:
interrupt logic circuitry for evaluating in parallel other instructions being processed in the instruction pipeline to determine whether another instruction is able to complete without a fault indication, wherein the other instruction is an older instruction than the instruction for which the exceptional condition was detected.

23. A computer readable non-transitory medium encoded with computer readable program data and code, the program data and code when executed operable to:
- detecting an exceptional condition resulting from a failed execution of an instruction in one or more stages of an instruction pipeline in a processor;
- checking an instruction cache for the presence of an instruction at a starting address of an interrupt handler in response to the detected exceptional condition and prior to the processor accepting an interrupt in which the instruction at the starting address of the interrupt handler is fetched in response to the detected exceptional condition; and
- prefetching the instruction at the starting address of the interrupt handler from storage other than the instruction cache when the instruction is not present in the instruction cache to load the instruction in the instruction cache, whereby the instruction is made available in the instruction cache by the time the processor accepts the interrupt in response to the detected exceptional condition.

24. A computer readable non-transitory medium encoded with computer readable program data and code, the program data and code when executed operable to:
- detecting an exceptional condition in one or more stages of an instruction pipeline in a processor;
- checking an instruction cache for the presence of an instruction at a vector address held in an interrupt vector table in response to the detected exceptional condition and prior to the processor accepting an interrupt in which the instruction at the vector address is fetched in response to the detected exceptional condition; and
- prefetching the instruction from storage other than the instruction cache when the instruction is not present in the instruction cache to load the instruction and the vector table in the instruction cache.

25. A processor with interrupt processing logic comprising:
- means operable at various stages of a processor pipeline to detect one or more exceptional conditions;
- means operable to generate an exception vector address based on a predetermined priority for the highest priority detected exceptional condition selected from one or more detected exceptional conditions;
- means operable to check an instruction cache for the presence of an instruction at the exception vector address in response to the selected exceptional condition and prior to the processor accepting an interrupt in response to the detected exceptional condition; and
- means operable to prefetch the instruction at the exception vector address in storage above the instruction cache when the instruction is not present in the instruction cache in order to load the instruction in the instruction cache, whereby the instruction is made available in the instruction cache by the time the processor accepts the interrupt in response to the detected exceptional condition.

* * * * *